US010872168B1

(12) United States Patent
Yang

(10) Patent No.: US 10,872,168 B1
(45) Date of Patent: Dec. 22, 2020

(54) METHOD AND SYSTEM FOR PROVIDING USER NOTIFICATION WHEN PERSONAL INFORMATION IS USED IN VOICE CONTROL DEVICE

(71) Applicant: Piamond Corp., Busan (KR)

(72) Inventor: Jinhong Yang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 16/842,834

(22) Filed: Apr. 8, 2020

(30) Foreign Application Priority Data

Jun. 7, 2019 (KR) .................. 10-2019-0067313

(51) Int. Cl.
G06F 21/62 (2013.01)
G06Q 50/26 (2012.01)
G10L 17/22 (2013.01)
G06F 16/635 (2019.01)
G06Q 10/10 (2012.01)

(52) U.S. Cl.
CPC ........ G06F 21/6245 (2013.01); G06F 16/635 (2019.01); G06Q 10/107 (2013.01); G06Q 50/265 (2013.01); G10L 17/22 (2013.01)

(58) Field of Classification Search
CPC ... G06F 21/6245; G06F 16/635; G10L 17/22; G10L 17/24; G10L 17/26; G10L 17/005; G10L 17/12; G10L 17/14; G06Q 50/265; G06Q 10/107; G16Y 30/00; G16Y 40/00
See application file for complete search history.

(56) References Cited

U.S. PATENT DOCUMENTS

| 10,096,234 | B1 * | 10/2018 | Chun | .................. G10L 15/08 |
| 10,255,419 | B1 * | 4/2019 | Kragh | ................. H04L 9/3247 |
| 10,438,200 | B1 * | 10/2019 | Griffith | ............. G06Q 20/4014 |
| 10,630,840 | B1 * | 4/2020 | Karp | ..................... G06F 9/547 |

(Continued)

FOREIGN PATENT DOCUMENTS

KR 10-2010-0026187 A 12/2010

OTHER PUBLICATIONS

Chung et al., "Alexa, Can I Trust You", 2017, IEEE Computer Society, pp. 100-104. (Year: 2017).*

(Continued)

Primary Examiner — Matthew Smithers
(74) Attorney, Agent, or Firm — Cahn & Samuels, LLP

(57) ABSTRACT

Disclosed are a method and system for providing user notification when personal information is used in a speech controller. A method of providing user notification may include receiving information monitored for reference to personal information in a process of processing a user's query in a voice service, storing a personal information utilization history for each user and for each service based on the monitored information, determining the suitability of the reference to the personal information based on the monitored information, determining whether the personal information is included in a response when generating the response to the user's query, generating and providing guide information indicating that the personal information is included in the response if the personal information is included in the response, and providing the response to the user's query based on feedback from the user for the guide information.

18 Claims, 8 Drawing Sheets

(56) References Cited

U.S. PATENT DOCUMENTS

| | | | | |
|---|---|---|---|---|
| 2003/0130893 A1* | 7/2003 | Farmer | ............ | G06Q 30/0266 705/14.63 |
| 2005/0044409 A1* | 2/2005 | Betz | .................... | G06F 21/629 726/4 |
| 2010/0265036 A1* | 10/2010 | Jung | ...................... | G06F 21/32 340/5.81 |
| 2011/0260832 A1* | 10/2011 | Ross | .................. | H04M 3/4872 340/5.84 |
| 2012/0331567 A1* | 12/2012 | Shelton | ............... | G06Q 20/102 726/28 |
| 2014/0254778 A1* | 9/2014 | Zeppenfeld | .......... | H04M 3/523 379/88.02 |
| 2017/0169506 A1* | 6/2017 | Wishne | ............. | G06Q 20/3221 |
| 2018/0082683 A1* | 3/2018 | Chen | .................. | G06F 21/6263 |
| 2018/0322380 A1* | 11/2018 | Aggarwal | ............. | G06N 20/00 |
| 2018/0342121 A1* | 11/2018 | Borgmeyer | ............. | G07C 9/37 |
| 2018/0357286 A1* | 12/2018 | Wang | .................. | G06K 9/6267 |
| 2019/0018694 A1* | 1/2019 | Rhodes | .................. | G10L 15/26 |
| 2019/0074006 A1* | 3/2019 | Kumar | ................... | G10L 15/22 |
| 2019/0104124 A1* | 4/2019 | Buford | ............... | G06F 21/6245 |
| 2019/0197864 A1* | 6/2019 | Hui | .................... | G08B 21/0277 |
| 2019/0347387 A1* | 11/2019 | Woodward | ........ | G06F 21/6245 |
| 2020/0004762 A1* | 1/2020 | Malhotra | ............ | H04L 63/101 |
| 2020/0007579 A1* | 1/2020 | Barday | ............... | G06F 21/6245 |
| 2020/0059468 A1* | 2/2020 | Wolosewicz | .......... | G10L 15/22 |

OTHER PUBLICATIONS

Liu et ., "Content-Oriented User Modeling for Personalized Response Ranking in Chatbots", Jan. 2018, IEEE/ACM Transactions on Audio, Speech, and Language Processing, vol. 26, No. 1, pp. 122-133. (Year: 2018).*

Daniel et al., "Toward Truly Personal Chatbots", 2018, ACM/IEEE 1st International Workshop on Software Engineering for Cognitive Services, pp. 31-36. (Year: 2018).*

Cha et ., "Privacy Enhancing Technologies in the Internet of Things: Perspectives and Challenges", Apr. 2019, IEEE Internet of Things Journal, vol. 6, No. 2, pp. 2159-2187. (Year: 2019).*

English Abstract of KR 10-2010-0026187, Dec. 17, 2010.

* cited by examiner

//\# METHOD AND SYSTEM FOR PROVIDING USER NOTIFICATION WHEN PERSONAL INFORMATION IS USED IN VOICE CONTROL DEVICE

CROSS REFERENCE TO RELATED APPLICATION

This application is based on and claims priority under 35 U.S.C. 119 to Korean Patent Application 10-2019-0067313, filed on Jun. 7, 2019, in the Korean Intellectual Property Office, the disclosure of which is herein incorporated by reference.

BACKGROUND OF THE INVENTION

1. Technical Field

The present disclosure relates to a method and system for providing user notification when personal information is used in a speech controller.

2. Description of the Related Art

There are various speech controllers for recognizing a speech and processing a command based on the recognized speech, such as a smartphone and a smart speaker. For example, Korean Patent Application Publication No. 10-2010-0026187 discloses a scheme for generating speech recognition information for speech recognition and providing a broadcasting service through a speech input using the speech recognition information.

Such speech processing information refers to a user's personal information in a process of processing the user's speech. However, there is no method for a user to selectively determine whether to provide a response using such personal information or checking the range in which the personal information is used.

SUMMARY OF THE INVENTION

Embodiments of the present disclosure provide a method of providing user notification, which can provide a function for enabling a user to determine whether personal information is used and whether the personal information is included in a response result by monitoring reference to the personal information at reference points where reference is made to the personal information in voice service processing, a computer device for performing the method, a computer program stored in a computer-readable recording medium coupled to the computer device in order to execute the method in the computer device, and a computer-readable recording medium thereof.

Embodiments of the present disclosure provide a method of providing user notification, which can provide a user with guide information indicating that personal information is included in a response result and provide a response result including personal information based on feedback for guide information, a computer device for performing the method, a computer program stored in a computer-readable recording medium coupled to the computer device in order to execute the method in the computer device, and a computer-readable recording medium thereof.

A method of providing user notification in a computer device including at least one processor includes receiving, by the at least one processor, information monitored for reference to personal information in a process of processing a user's query in a voice service, storing, by the at least one processor, a personal information utilization history for each user and for each service based on the monitored information, determining, by the at least one processor, the suitability of the reference to the personal information based on the monitored information, determining, by the at least one processor, whether the personal information is included in a response when generating the response to the user's query, generating and providing, by the at least one processor, guide information indicating that the personal information is included in the response if the personal information is included in the response, and providing, by the at least one processor, the response to the user's query based on feedback from the user for the guide information.

According to one aspect, the personal information may include at least one of personally identifiable information (PII) and potential personally identifiable information (PPII).

According to another aspect, the reference to the personal information may be performed at least one reference point of a device that captures a speech corresponding to the user's query, the voice service that processes the captured speech, and an external service invoked by the voice service.

According to yet another aspect, determining the suitability may include whether user consent has been performed normally in relation to access to the personal information of the user identified based on the monitored information.

According to yet another aspect, determining the suitability may include determining whether a service policy has been violated in relation to access to the personal information of the user identified based on the monitored information.

According to yet another aspect, the personal information of the user may be managed based on a grade or score according to at least one of a group for each user, a policy for each service and personal information handling regulations suggested in a corresponding country. Determining the suitability may include determining the suitability of the reference to the personal information based on a grade or score calculated for the reference to the personal information and a grade or score for the personal information of the user.

According to yet another aspect, generating and providing the guide information may include generating the guide information based on query words defined by the voice service or a personal information usage policy of the voice service. The guide information may include related service provisions for responding to the user's additional query about the guide information.

According to yet another aspect, providing the response to the user's query may include providing the response to the user's query through a response channel preset by the user or a response channel configured through the feedback from the user.

According to yet another aspect, the response channel may include two or more of a speech output channel through a speaker included in a device of the user, a push notification channel for an application installed in the device of the user, a message transmission channel using a short message service (SMS) for the device of the user, a message transmission channel using an e-mail account of the user, and an information display channel through a screen of another device related to the user.

According to yet another aspect, a server providing the voice service may be configured to recognize the user based on speech information corresponding to the user's query, issue a permission key capable of accessing the personal information of the recognized user, check user consent and a service policy based on the permission key when a command selected based on the speech information accesses the personal information of the user, issue an access token having a grade based on the user consent and the service policy, generate a response related to the personal information of the user by confirming the grade of the access token when a service using the access token is invoked.

There is provided a computer program combined with a computer device and stored in a computer-readable recording medium in order to execute the method in the computer device.

There is provided a computer-readable recording medium in which a computer program for executing the method in a computer device is written.

A computer device includes at least one processor configured to execute a computer-readable command. The at least one processor is configured to receive information monitored for reference to personal information in a process of processing a user's query in a voice service, store a personal information utilization history for each user and for each service based on the monitored information, determine suitability of the reference to the personal information based on the monitored information, determine whether the personal information is included in a response when generating the response to the user's query, generate and provide guide information indicating that the personal information is included in the response, and provide the response to the user's query based on feedback from the user for the guide information.

DETAILED DESCRIPTION

The present disclosure may be modified in various ways and may have various embodiments, and specific embodiments will be described in detail with reference to the accompanying drawings.

In describing the present disclosure, a detailed description of the known technologies will be omitted if it is deemed to make the gist of the present disclosure unnecessarily vague.

A user notification providing system according to various embodiments of the present disclosure may be implemented by at least one computer device. A computer program according to an embodiment of the disclosure may be installed and driven in the computer device. The computer device may perform a method of providing user notification according to an embodiment of the disclosure under the control of a driven computer program. The computer program may be stored in a computer-readable recording medium coupled to the computer device in order to execute the method of providing user notification in the computer device.

Figure 1:
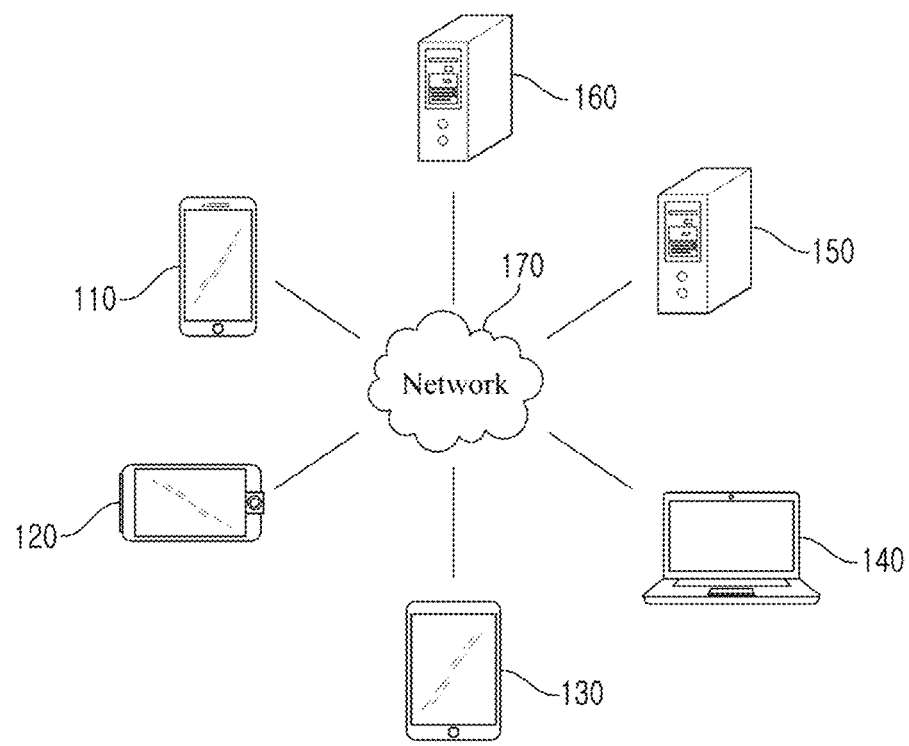
FIG. 1 is a diagram illustrating an example of a network environment according to an embodiment of the disclosure.

FIG. 1 is a diagram illustrating an example of a network environment according to an embodiment of the disclosure. In FIG. 1, the network environment illustrates an example including a plurality of electronic devices 110, 120, 130 and 140, a plurality of servers 150 and 160, and a network 170. FIG. 1 is an example of a description of the disclosure, and the number of electronic devices or the number of servers is not limited like FIG. 1. Furthermore, the network environment of FIG. 1 illustrates only one of environments which may be applied to the present embodiments, and an environment applicable to the present embodiments is not limited to the network environment of FIG. 1.

The plurality of electronic devices 110, 120, 130 and 140 may be stationary devices or mobile devices implemented as computer devices. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, smart TV, and a connected car dashboard. For example, in FIG. 1, an example of a shape of the electronic device 1 (110) is illustrated as being a smartphone. However, in embodiments of the present disclosure, the electronic device 1 (110) may mean one of various physical computer devices capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides a command, code, a file, content, or a service through communication with the plurality of electronic devices 110, 120, 130 and 140 over the network 170. For example, the server 150 may be a system that provides a service (e.g., a videotelephony service, a financial service, a settlement service, a social network service, a messaging service, a search service, a mail service, a content provision service, a question and answer service, or a game service) to the plurality of electronic devices 110, 120, 130 and 140 connected thereto over the network 170.

Figure 2:
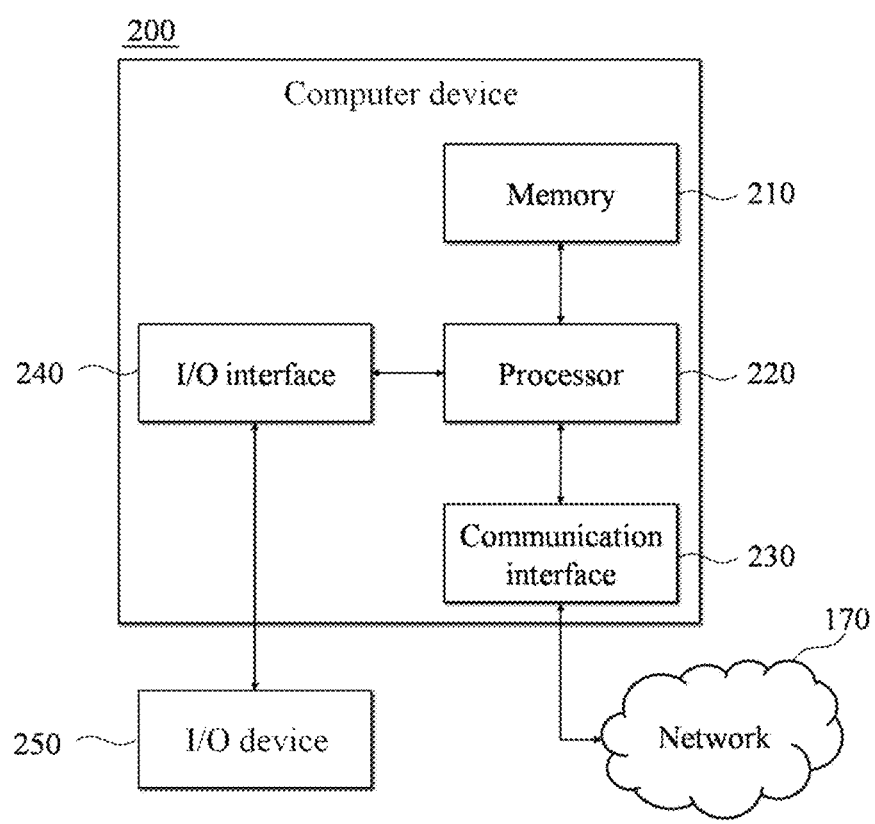
FIG. 2 is a block diagram illustrating an example of a computer device according to an embodiment of the disclosure.

FIG. 2 is a block diagram illustrating an example of a computer device according to an embodiment of the disclosure. Each of the plurality of electronic devices 110, 120, 130 and 140 or each of the servers 150 and 160 may be implemented by a computer device 200 illustrated in FIG. 2. A method according to various embodiments of the present disclosure may be performed by the computer device 200.

In this case, as illustrated in FIG. 2, the computer device 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g., the aforementioned storage devices) over the network 170. For example, a request, a command, data or a file generated by the processor 220 of the computer device 200 based on program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer device 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. The I/O device 250 may be configured as a single device along with the computer device 200.

Furthermore, in other embodiments, the computer device 200 may include elements greater or smaller than the elements of FIG. 2. However, it is not necessary to clearly illustrate most of conventional elements. For example, the computer device 200 may be implemented to include at least some of the I/O device 250 or may further include other elements, such as a transceiver and a database.

Figure 3:
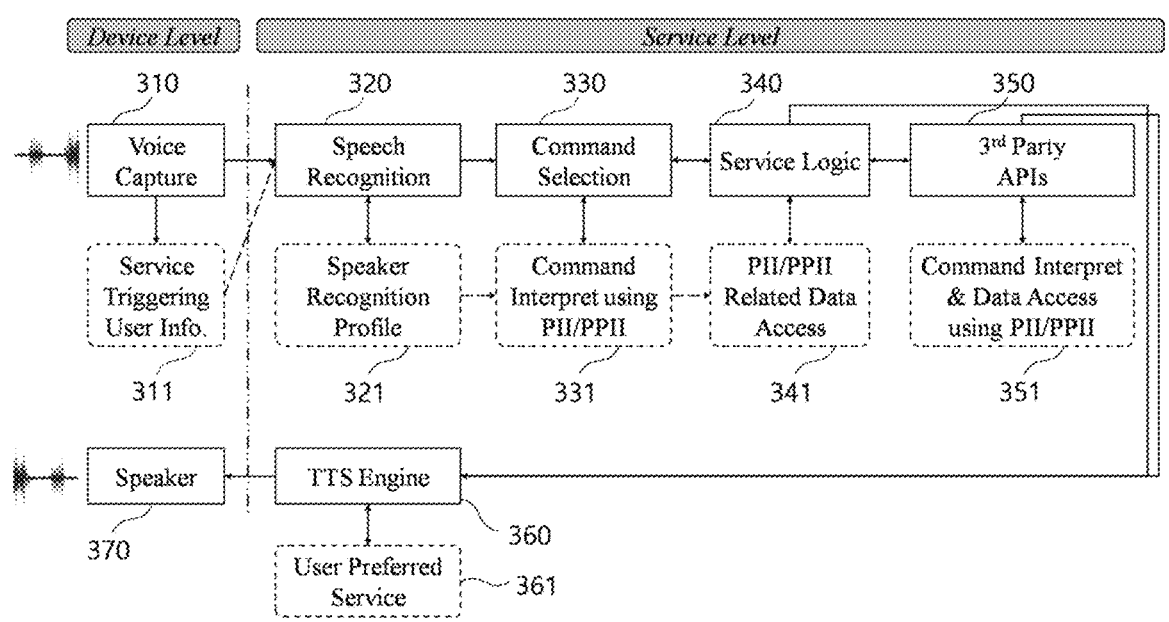
FIG. 3 is a diagram for describing personal information reference points in voice service processing according to an embodiment of the disclosure.

FIG. 3 is a diagram for describing personal information reference points in voice service processing according to an embodiment of the disclosure. FIG. 3 illustrates reference modules at points where reference is made to personal information and an example in which the personal information is used in each of a device level and a service level. In this case, the personal information may include personally identifiable information (PII) and potential personally identifiable information (PPII).

A voice capture module 310 may be included in a hardware device, such as a smartphone or smart speaker for capturing a user's speech through a microphone. In this case, a PII and/or a PPII may be inferred based on various types of information, such as a universally unique identifier (UUID), media access control (MAC), IP address or user identifier of the hardware device.

A speech recognition module 320 may include a module for providing a function for recognizing a captured speech command of a user in a text string form. For example, the speech recognition module 320 may include an automatic speech recognition (ASR) function, and may generate text data as results. If speaker-based speech recognition is supported, a detailed user (or speaker) can be inferred because speech recognition is performed based on speaker information learnt in a device that performs speech recognition.

A command selection module 330 may include a module for selecting a related service based on a recognized speech command. For example, the command selection module may include a natural language understanding (NLU) function. If an intent or an entity is processed based on a domain, a function for inferring or selecting a command using speaker information or a PII may be provided.

A service logic module 340 may include a module for executing a speech command for the purpose of a response according to a user's speech command. For example, the service logic module 340 may be configured and provided in a Lambda form based on a Function as a Service (FaaS). When a knowledge base (KB) for a voice service is invoked, an API that explicitly accesses a PII and/or a PPII may be invoked.

A $3^{rd}$ party API module 350 is a module which may be provided by an external service provider, and may be used if a recognized speech command deviates from its own service category or if it needs to operate in conjunction with a specific external service when the recognized speech command is processed. In this case, when a command is invoked, reference may be made to personal information of a PII and/or a PPII in such a manner that a voice service provider provides user-related information or device-related information of an invoked command.

A text-to-speech (US) engine 360 may include a module for generating a speech corresponding to a text sentence that has been received as results. In this case, when the speech is generated, reference may be made to personal information of a PII and/or a PPII in such a manner that the speech is generated based on a user's setting or preference.

A speaker 370 may include a module for providing a speech to a user. The speaker 370 may be the speaker of a hardware device including the voice capture module 310. However, in some embodiments, the speaker 370 may be included in a separate hardware device different from the hardware device including the voice capture module 310.

In this case, in voice service processing, the usage form of a PII and/or a PPII may be described as follows.

Service triggering user Info. 311 may be used in a form to connect user configuration information based on a designated trigger name when a service is invoked in the voice capture module 310 and the speech recognition module 320. For example, a case where two call names are used in a single device may be taken into consideration. If two or more trigger names are used for speaker recognition in a smart speaker for a living room, reference may be made to speaker information as a PII depending on which one of the two or more trigger names is recognized. For another example, if several devices are present in one place (e.g., house) and are named differently, reference may be made to location information in addition to speaker information as a PII.

A speaker recognition profile 321 may be used in the speech recognition module 320 in a form to identify a user based on a speech tone, a tone, etc. through an input speech signal. In this case, reference may be made to the speaker information as a PII.

Command interpret using PII/PPII 331 may be used in the command selection module 330 in a form to perform a corresponding command interpretation task based on a text string. For example, when a speech command is interpreted in the service level, a weight may be assigned the selection of a command based on user information. In this case, reference may be made to a user profile, user preference, a user history, a location, weather (based on a location), a time zone, or around noise as a PII and/or a PPII. Reference may be made to a knowledge base (KB) or today's news as non-personally identifiable information (NPII).

PII/PPII-related data access 341 may be used in the service logic module 340 in a form to use information (e.g., a today's schedule or commute time of a user or an exchange rate (residence currency)) directly related to a user. In this case, reference may be made to user information, a user profile, the location of a user, or the time zone of a user as a PII.

Command interpret & data access using PII/PPII 351 may be used in the $3^{rd}$ party API module 350 in such a manner that the command interpret & data access using PII/PPII 351 is connected to an external API or an external service and personal information is used. For example, in an external service, personal information may be used in a process of paying a shopping basket product or confirming delivery information and checking ticket information through a speech command. In this case, reference may be made to user identification information, an API type or an API call pattern as a PII and/or a PPII.

A user preferred service 361 may be used in the TTS engine 360 in a form to use a user configuration, such as an output voice preferred by a user in generating a speech.

Figure 4:
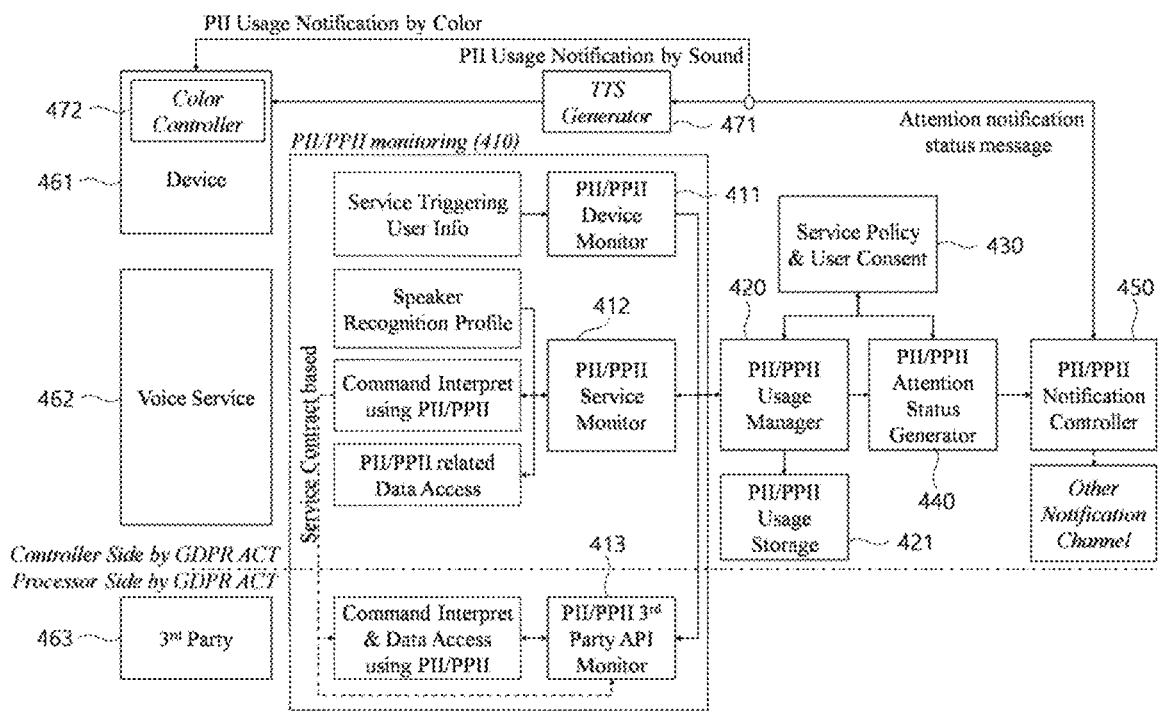
FIG. 4 is a diagram illustrating an example of the configuration of a user notification providing system according to an embodiment of the disclosure.

FIG. 4 is a diagram illustrating an example of the configuration of a user notification providing system according to an embodiment of the disclosure. The user notification providing system according to the present embodiment may include a PII/PPII monitoring module 410, a PII/PPII usage manager 420, a service policy & user consent module 430, a PII/PPII attention status generator 440, and a PII/PPII notification controller 450.

The PII/PPII monitoring module 410 may provide a monitoring function for all of a device 461, a voice service 462, and a $3^{rd}$ party 463 in order to provide a PII/PPII monitoring function in a voice service. As illustrated in FIG. 4, the PII/PPII monitoring module 410 may include a PII/PPII device monitor 411, a PII/PPII service monitor 412 and a PII/PPII $3^{rd}$ party API monitor 413.

The PII/PPII device monitor 411 may include a module for obtaining user information upon service triggering in a user's end device (e.g., the device 461). For example, the PII/PPII device monitor 411 may monitor that user information as a PII and/or PPII recognized in the device 461 is additionally provided to the voice service 462 on the server side with respect to a speech.

The PII/PPII service monitor 412 may include a module for providing the monitoring of user information which is used when the voice service 462 is processed on the server side. The PII/PPII service monitor 412 may operate based on the characteristics of each service stage. For example, in relation to a speaker recognition profile, the voice service 462 may recognize set user information and assign a weight based on user information uploaded from the device 461. In this case, a speaker recognition ratio may be provided as numerical information. Accordingly, if a weight of less than a given level is incorporated upon command Interpret using PII/PPII, the PII/PPII service monitor 412 may monitor that a PPII not a PII has been used. If a weight of a given level or more is incorporated, the PII/PPII service monitor 412 may monitor that a PII has been used.

The PII/PPII $3^{rd}$ party API monitor 413 may include a module for providing a function for monitoring that a PII is included in corresponding call information or a corresponding API explicitly uses personal information when an external service of the $3^{rd}$ party 463 is invoked if the PII is included in the corresponding call information or the corresponding API explicitly uses the personal information.

If a PII is included, the PII/PPII $3^{rd}$ party API monitor 413 may record the PII and may record pieces of encrypted and anonymized information of corresponding information. Furthermore, if an invoked API explicitly uses personal information, the PII/PPII $3^{rd}$ party API monitor 413 may record information for determining an API policy and a user consent based on a service contract. If an external API explicitly uses personal information, the PII/PPII $3^{rd}$ party API monitor 413 needs to comply with the guideline of a system for encryption and anonymization.

The PII/PPII usage manager 420 may provide a function for recording and managing the use history of a PII/PPII collected in the PII/PPII device monitor 411, the PII/PPII service monitor 412 and the PII/PPII $3^{rd}$ party API monitor 413. In this case, the characteristics of user information may be managed for each grade based on personal information handling regulations proposed by a group for each user or a corresponding country. A group or country for the corresponding information may be determined based on user information and a point where computing power at a service triggering point is located at invoking timing. Furthermore, the use history of the PII/PPII may include geographical information, security information, etc. and may also include information for each service that a user has actually joined. Pieces of information recorded by the PII/PPII usage manager 420 may be stored in a PII/PPII usage storage 421.

The service policy & user consent module 430 may manage a portion regarding a service policy and a user consent. Policies related to the use of a PII/PPII for each service may be managed in various forms, such as a grade or a score. A user consent may be performed by grouping the policies or may be individually performed. If major information of the policies is accessed, a condition for notifying that personal information may be included in a corresponding response prior to a speech response may be included depending on a user's selection or a service policy.

The PII/PPII attention status generator 440 may provide a function for determining whether personal information is used and personal information is included in a response result based on the use characteristics of the personal information of the voice service. To this end, if personal information access is necessary to process a corresponding user's query, the PII/PPII attention status generator 440 may determine a service that the user has joined and whether the user has given consent to the service, and may determine whether the personal information access of a proper level has been performed for a response based on a corresponding result or grade. Furthermore, after generating response information to be provided to the user, the PII/PPII attention status generator 440 may determine whether the personal information is included in the generated response information, and may determine a grade for using the personal information if the personal information is included in the response information. Furthermore, the PII/PPII attention status generator 440 may notify the user that the response information including the personal information may be provided. If major personal information is included, the PII/PPII attention status generator 440 may provide a function for inducing a user to determine whether he or she will identify a corresponding result value through a previous query.

The PII/PPII notification controller 450 will be described later more specifically. PII usage notification provided through the PII/PPII notification controller 450 may be output by the device 461 through a sound or color. For example, PII usage notification based on a sound may be converted into a speech through a TTS generator 471 and output through the device 461. PII usage notification based on a color may be output through a color controller 472 which may be included in the device 461.

Each of the server side and hardware device for the device 461 and the voice service 462 may be implemented by the computer device 200 described with reference to FIG. 2. For example, the voice capture module 310 and the color controller 472 may be functional representations of the processor 220 included in the computer device 200 that implements the device 461. For another example, the speech recognition module 320, the command selection module 330, the service logic module 340, the TTS engine 360, the PII/PPII monitoring module 410, the PII/PPII device monitor 411, the PII/PPII service monitor 412, the PII/PPII 3rd party API monitor 413, the PII/PPII usage manager 420, the service policy & user consent module 430, the PII/PPII attention status generator 440, the PII/PPII notification controller 450 and the TTS generator 471 may be functional representations of the processor 220 included in the computer device 200 that implements the server side. In some embodiments, at least one element may be exchanged between the device 461 and the server side. For example, the TTS generator 471 may be included in the device 461 not the server side. Furthermore, the $3^{rd}$ party API module 350 may be a functional representation of the processor 220 included in the computer device 200 that implements a hardware device of an external service provider.

Figure 5:
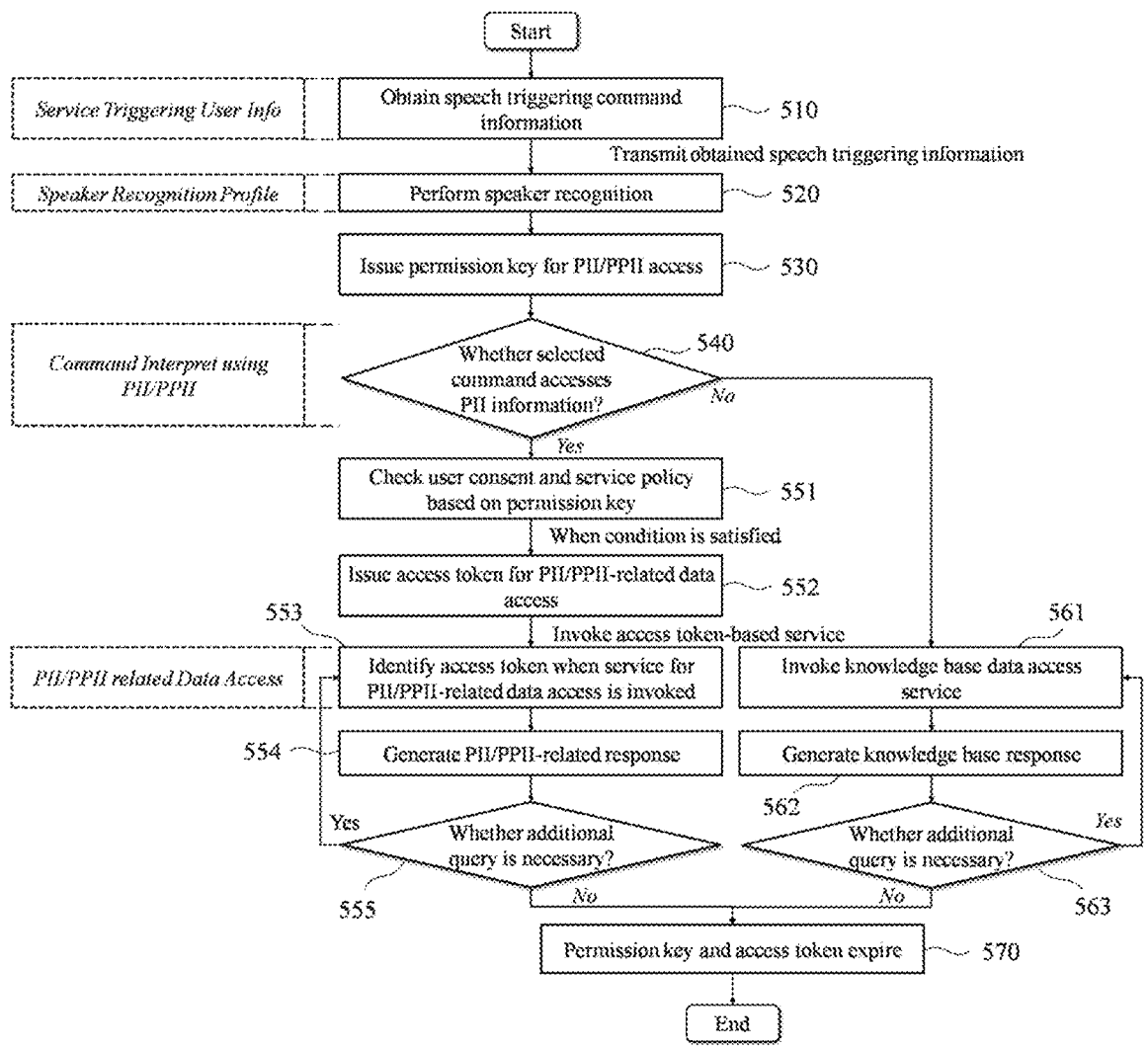
FIG. 5 is a flowchart illustrating an example of a PII/PPII-based monitoring and service processing process according to an embodiment of the disclosure.

FIG. 5 is a flowchart illustrating an example of a PII/PPII-based monitoring and service processing process according to an embodiment of the disclosure. The handling process of FIG. 5 may be performed by the device 461 or the server side for the voice service 462. In this case, each of the device 461 and the server side may be implemented by the computer device 200 described with reference to FIG. 2 as described above.

At step 510, the device 461 may obtain speech triggering command information. For example, the device 461 of a user may obtain speech triggering command information, may transmit initial speech information for speaker recognition to the server side for the voice service 462 at triggering timing or may autonomously determine the speech triggering command information if it can autonomously determine the speech triggering command information, may encrypt corresponding user recognition information, and may transmit the corresponding user recognition information to the server side.

At step 520, the server side for the voice service 462 may perform speaker recognition. For example, the server side may perform speaker recognition based on speech information received from the device 461. In this case, the server side may additionally assign a weight upon speaker recognition based on information further collected by the device 461.

At step 530, the server side may issue a permission key for a PII/PPII access. For example, when a speaker is recognized, the server side may issue a permission key capable of accessing information on a specific speaker for service processing based on corresponding speaker information in a subsequent service processing process. Thereafter, if services correspond to a call whose PII/PPII information is accessed, the services may be processed after the validity of a permission key is always checked in the corresponding call. The permission key may include expiration time information. Information that may be accessed based on speaker recognition needs to be separately defined in the entire service process. When a user service use consent is performed, notification for the consent and a user consent may be performed.

At step 540, the server side may determine whether a selected command accesses PII information. In this case, the selected command may be based on a user's speech command. The server side may perform step 551 if the selected command accesses the PII information, and may perform step 561 if the selected command does not access the PII information.

At step 551, the server side may check a user consent and service policy based on the permission key. In this case, the server side may match the service policy and user consent of a corresponding user based on hash information of the permission key not a form to use user information. To this end, the server side may match the service policy and user consent of the corresponding user based on a query through the PII/PPII usage manager 420. Subsequent processes may be performed only when a condition based on the matching is satisfied. Information based on the issue of the permission key or the issue of a token is monitored. Pieces of relation information, such as the logical/physical ID, location information or timing of a calling device, may be stored together and managed.

At step 552, the server side may issue an access token for PII/PPII-related data access. The access token may be performed if the condition based on matching between the service policy and the user consent is satisfied. A grade of the access token may be determined based on a grade determined based on the matching. The access token may include a grade, an expiration date, the type of services that may be invoked and/or number information. If a complex query needs to be performed, restrictions may be imposed so that a sufficient query is not performed by limiting the number of access tokens.

At step 553, the server side may identify the access token when a service for PII/PPII-related data access is invoked. At step 554, the server side may generate a PII/PPII-related response.

At step 555, the server side may determine whether an additional query is necessary. If an additional query is necessary, step 553 may be performed again. If an additional query is not necessary, step 570 may be performed.

In contrast, if the selected command does not access PII information at step 540, step 561 may be performed.

At step 561, the server side may invoke a knowledge base data access service. At step 562, the server side may generate a knowledge base response. Step 561 and step 562 may be a process of generating and providing a response through common knowledge base data in response to a user speech command that does not access personal information of the user.

At step 564, the server side may determine whether an additional query is necessary. If an additional query is necessary, step 561 may be performed again. If an additional query is not necessary, step 570 may be performed.

At step 570, the server side may terminate the permission key and the access token so that they expire.

In such a PII/PPII-based monitoring and service process, the processing of the PII/PPII may be monitored based on a permission key and an access token. Monitored information may be recorded in the PII/PPII usage manager 420 a process of matching a user consent and a service policy.

Figure 6:
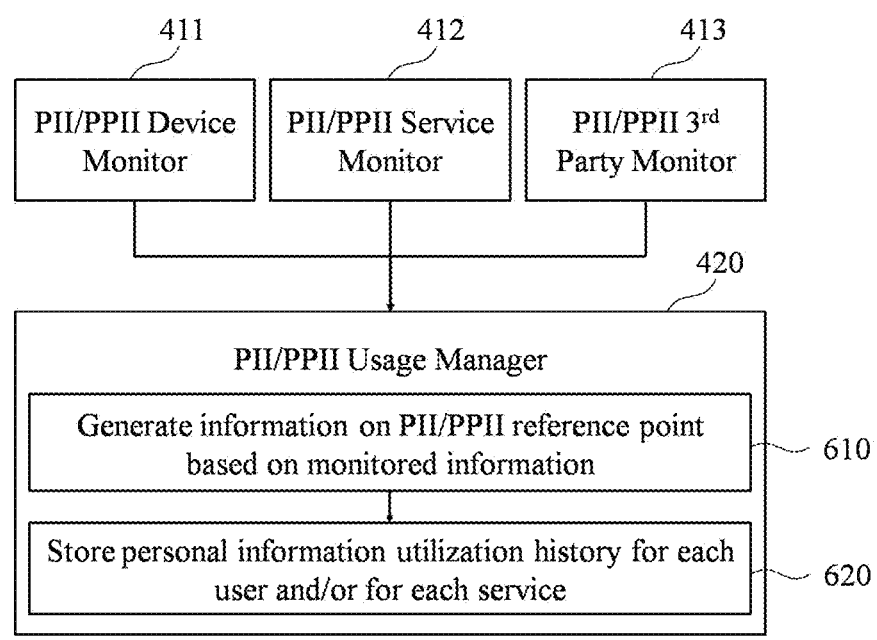
FIG. 6 is a flowchart illustrating an example of an operating process of a PII/PPII usage manager according to an embodiment of the disclosure.

FIG. 6 is a flowchart illustrating an example of an operating process of the PII/PPII usage manager according to an embodiment of the disclosure. Reference to a PII/PPI occurring in the service processing process described with reference to FIG. 5 may be monitored through the PII/PPII device monitor 411, the PII/PPII service monitor 412 and the PII/PPII 3$^{rd}$ party API monitor 413, and may be processed by the PII/PPII usage manager 420.

At step 610, the PII/PPII usage manager 420 may generate information on a PII/PPII reference point based on monitored information. The generation of the information on a PII/PPII reference point may include corresponding monitoring timing, physical device information (e.g., a UUID or MAC), logical device information (e.g., a unique service ID or user ID information), area information including a location, and a point where a computing service whose corresponding service has been triggered is located.

At step 620, the PII/PPII usage manager 420 may store a personal information utilization history for each user and/or for each service. For example, the personal information utilization history may be stored in the PII/PPII usage storage 421 described with reference to FIG. 4.

Figure 7:
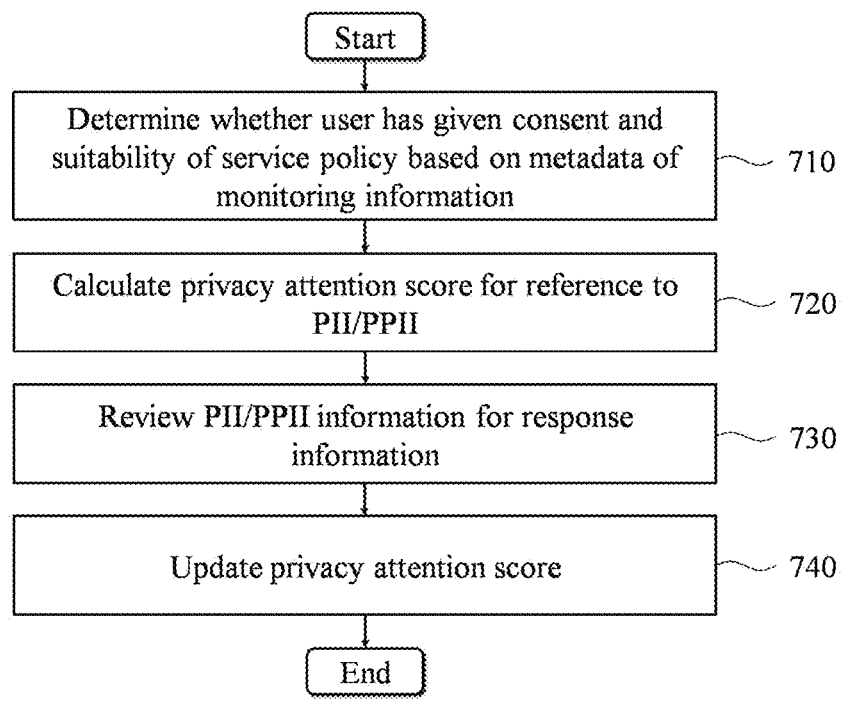
FIG. 7 is a flowchart illustrating an example of an operating process of a PII/PPII attention status generator according to an embodiment of the disclosure.

FIG. 7 is a flowchart illustrating an example of an operating process of the PII/PPII attention status generator according to an embodiment of the disclosure.

At step 710, the PII/PPII attention status generator 440 may determine whether a user has given consent and the suitability of a service policy based on the metadata of monitoring information. For example, the PII/PPII attention status generator 440 may determine whether consent to the PII/PPII access of a corresponding user has been performed normally based on identified user information. In this case, the user consent may be performed for each item, or a grade or a separate privacy level may be assigned to a service and whether consent has been performed normally may be determined depending on whether the grade or separate privacy level has been satisfied. Furthermore, the PII/PPII attention status generator 440 may calculate a grade or attention score of a level described in the access of user information. The PII/PPII attention status generator 440 may determine whether a service policy for PII/PPII access has been violated. For example, if a call for a 3$^{rd}$ party service has not been performed, the PII/PPII attention status generator 440 may monitor whether a procedure, such as anonymization or non-identification, has been performed correctly when providing corresponding information. Furthermore, the PII/PPII attention status generator 440 may also monitor frequent access to sensitive personal information. In this case, the PII/PPII attention status generator 440 may calculate a grade or attention score of a level described in service access.

At step 720, the PII/PPII attention status generator 440 may calculate a privacy attention score for reference to a PII/PPII. For example, the PII/PPII attention status generator 440 may calculate a privacy attention score by adding an attention score defined in a user consent article and an attention score defined in a service policy. In this case, if a user uses a separate privacy criterion, the PII/PPII attention status generator 440 may generate a privacy attention score as a corresponding reference value.

At step 730, the PII/PPII attention status generator 440 may review PII/PPII information for response information. For example, when generating response information based on a user query (or a speech command), the PII/PPII attention status generator 440 may determine whether PII/PPII information is included in the corresponding information. In this case, in order to determine whether the PII/PPII information is included in the response information, a data understanding function based on natural language processing (NLP) may be used. Furthermore, in relation to the PII information, the classification of an object for each PII may be performed by identifying personal information according to industry standards, such as NIST-80-122 and FIPS 199, and may comply with the regulations of a country in which a device whose corresponding service has been triggered is located. Examples of the PII may include a credit card use history, account-related information, non-disclosure calendar information, and contact information.

At step 740, the PII/PPII attention status generator 440 may update the privacy attention score.

Figure 8:
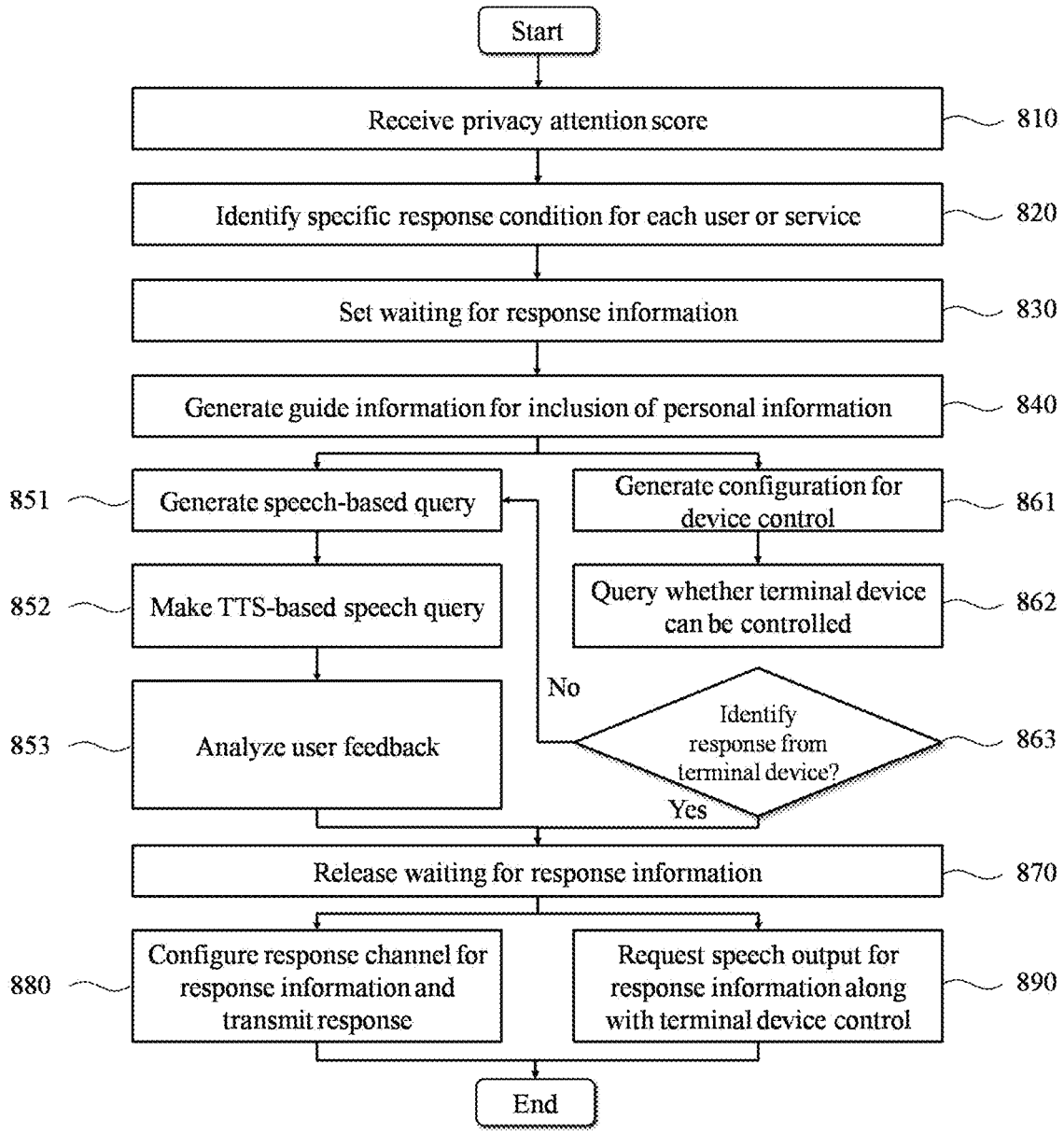
FIG. 8 is a flowchart illustrating an example of an operating process of a PII/PPII notification controller according to an embodiment of the disclosure.

FIG. 8 is a flowchart illustrating an example of an operating process of the PII/PPII notification controller according to an embodiment of the disclosure. The operating process of FIG. 8 may be performed by the PII/PPII notification controller 450 described with reference to FIG. 4.

At step 810, the PII/PPII notification controller 450 may receive a privacy attention score. In this case, the privacy attention score may correspond to a privacy attention score updated by the PII/PPII attention status generator 440 at step 740 of FIG. 7.

At step 820, the PII/PPII notification controller 450 may identify a specific response condition for each user or service. For example, a user may set a response condition for a PII/PPII for each user or service. In this case, the PII/PPII notification controller 450 may select a channel and method to be queried based on the set response condition. For example, in the case of response information including account information, such as checking accounts, although a query is a speech query, a user may previously perform a configuration so that response information is received based on only a short message service (SMS) or push notification of a user device. In this case, the PII/PPII notification controller 450 may provide a user with response information for the speech query through an SMS or push notification not a speech. Furthermore, if voice service information is represented in association with a screen of another device, such as TV, the PII/PPII notification controller 450 may previously block the exposure of a corresponding service based on a user configuration. For example, in an embodiment of an account query, the PII/PPII notification controller 450 may block response information including account information so that the response information is not displayed through a screen of another device.

At step 830, the PII/PPII notification controller 450 may set waiting for response information. For example, if the attention score is a given value or more and/or complies with a response condition, the PII/PPII notification controller 450 may set waiting for response information. Such waiting may be released based on user feedback or whether a device can be controlled.

At step 840, the PII/PPII notification controller 450 may generate guide information for the inclusion of personal information. In this case, the guide information for notifying whether the personal information is included may be generated based on query words defined by a corresponding service or a personal information usage policy. The guide information may include an additional query of a user, for example, information of related service provisions which may respond to "On which policy is the guide provided?" The guide information may be configured with a portion for a speech query and information that may be queried using a control signal (e.g., a speech, a tone, light or vibration) on a device. For example, as described above with reference to FIG. 4, PII usage notification provided through the PII/PPII notification controller 450 may be output using the US generator 471 or the color controller 472 in a sound or color form.

Steps 851 to 853 describe an example of a process of providing guide information based on a speech. Steps 861 to 863 describe an example of a process of controlling a device in order to provide the guide information through light or vibration. Only one of the processes may be selectively performed or the processes may be performed in parallel.

At step 851, the PII/PPII notification controller 450 may generate a speech-based query. At step 852, the PII/PPII notification controller 450 may make a US-based speech query. At step 853, the PII/PPII notification controller 450 may analyze user feedback. In other words, if a PII/PPII is included in response information, the PII/PPII notification controller 450 may generate, based on a speech, a query as to whether response information including such a PII/PPII may be delivered, may deliver the query to a user, and may analyze user feedback.

At step 861, the PII/PPII notification controller 450 may generate a configuration for device control. At step 862, the PII/PPII notification controller 450 may query whether a terminal device can be controlled. At step 863, the PII/PPII notification controller 450 may identify a response from the terminal device. The query as to whether the terminal device can be controlled may be a function for checking whether a corresponding function can be queried because a method that may be provided to the same code is different for each type/model/version of a user device. If a corresponding function is not present in the profile of the terminal device, the PII/PPII notification controller 450 may directly query the terminal device. If there is no response from the terminal device or a corresponding profile is not supported online, the PII/PPII notification controller 450 may perform step 851 for conversion in a speech query form.

After the guide information through the control signal (e.g., a speech, a tone, light or vibration) is provided, at step 870, the PII/PPII notification controller 450 may release the waiting for the response information. Thereafter, the PII/PPII notification controller 450 may process any one of step 880 and step 890.

At step 880, the PII/PPII notification controller 450 may configure a response channel for response information, and may transmit a response. Upon user query, a user may designate a specific channel (e.g., a smartphone app, SMS, e-mail or a second screen). If a service supports the specific channel, it may transmit a response through the corresponding channel. For example, if a user wants a response for a user query, input through a smart speaker, in a speech form, a response may be output using the smart speaker in the same manner. In this case, if a space configured with multiple speakers is present, the speech may be output through only a speaker at a close location where the corresponding user speech was recognized. If a user wants a specific app installed in a smartphone as an output channel, a response to a user's query may be transmitted to the smartphone of the user in the form of push notification.

At step 890, the PII/PPII notification controller 450 may request speech output for response information along with terminal device control.

In one embodiment, the computer device 200 configured to perform a method of providing user notification may be configured to receive, by the processor 220, information monitored for reference to personal information in a process of processing a user's query in a voice service, store a personal information utilization history for each user and for each service based on the monitored information, determine the suitability of the reference to the personal information based on the monitored information, determine whether the personal information is included in a response when generating the response to the user's query, generate and providing guide information indicating that the personal information is included in the response if the personal information is included in the response, and provide the response to the user's query based on feedback from the user for the guide information.

In this case, the personal information may include at least one of personally identifiable information (PII) and potential personally identifiable information (PPII).

Furthermore, the reference to the personal information may be performed at least one reference point of a device that captures a speech corresponding to the user's query, the voice service that processes the captured speech, and an external service invoked by the voice service.

Furthermore, in order to determine the suitability, the computer device 200 may determine whether user consent has been performed normally in relation to access to the personal information of the user identified based on the monitored information.

Furthermore, in order to determine the suitability, the computer device 200 may determine whether a service policy has been violated in relation to access to the personal information of the user identified based on the monitored information.

Furthermore, the personal information of the user may be managed based on a grade or score according to at least one of a group for each user, a policy for each service and personal information handling regulations suggested in a corresponding country. In this case, in order to determine the suitability, the computer device 200 may determine the suitability of the reference to the personal information based on a grade or score calculated for the reference to the personal information and a grade or score for the personal information of the user.

Furthermore, in order to generate and provide the guide information, the computer device 200 may generate the guide information based on query words defined by the voice service or a personal information usage policy of the voice service. In this case, the guide information may include related service provisions for responding to the user's additional query about the guide information.

Furthermore, in order to provide the response to the user's query, the computer device 200 provide the response to the user's query through a response channel preset by the user or a response channel configured through the feedback from the user. In this case, the response channel may include two or more of a speech output channel through a speaker included in a device of the user, a push notification channel for an application installed in the device of the user, a message transmission channel using a short message service (SMS) for the device of the user, a message transmission channel using an e-mail account of the user, and an information display channel through a screen of another device related to the user.

a server providing the voice service may be configured to recognize the user based on speech information corresponding to the user's query, issue a permission key capable of accessing the personal information of the recognized user, check user consent and a service policy based on the permission key when a command selected based on the speech information accesses the personal information of the user, issue an access token having a grade based on the user consent and the service policy, generate a response related to the personal information of the user by confirming the grade of the access token when a service using the access token is invoked.

For a detailed operation of the computer device 200, reference may be made to the embodiments of FIGS. 3 to 8.

As described above, various speech controllers configured to recognize a speech and to process a command based on the recognized speech, such as a smartphone or a smart speaker, can collect personal information and generate, in a speech form, data which may be included in the personal information. Accordingly, when a user gives consent, it is necessary to explicitly provide a user with caution and attention-related contents from the viewpoint of personal information usage and exposure. In this case, the recognition of a user can be improved by including a user consent procedure based on a speech from the viewpoint of a user consent user interface (UI)/user experience (UX). The computer device 200 that implements a speech controller to perform a method of providing user notification according to various embodiments of the present disclosure may output a speech for requesting consent to the usage and exposure of personal information. When a user registers a specific service or if personal information is used or exposed (e.g., when contents including personal information are output (or generated) through the speech controller) while a user uses a specific service, such a speech may be output by the speech controller in order to request, from the user, consent for the usage and exposure of the personal information. Furthermore, the computer device 200 may receive a response to the output speech, and may determine whether consent for the usage and exposure of the personal information has been given based on the contents of the received response. The speech controller may operate in conjunction with the server side for a process of determining whether the user has given consent. For example, the speech controller may capture a user's speech and transmit the captured speech to the server side like the device 461 or may only output a speech provided by the server side, and may perform a function for enabling the server side to generate a speech for requesting consent for the usage and exposure of personal information or to determine whether consent for the usage and exposure of the personal information has been given based on the contents of a response.

Furthermore, as various services are used while operating in conjunction with the speech controller, there is a good possibility that pieces of personal information may be generated through the speech controller. In particular, upon association with a $3^{rd}$ party service, in the existing technology, the service is provided to a user based on only simple user information consent (ID/PWD). However, there is a good possibility that contents including user personal information obtained from the service of a $3^{rd}$ party may be generated (or served) by the speech controller through an actual voice service. Accordingly, it is necessary to notify an issue from the viewpoint of the generation of personal information, which may occur upon consent for a $3^{rd}$ party service, in advance or at service provision timing. For example, the computer device 200 that implements a speech controller to perform a method of providing user notification according to various embodiments of the present disclosure may provide a user with information on an issue from the viewpoint of the generation of personal information, which may occur, in advance or at timing when a $3^{rd}$ party service is provided, while operating in conjunction with the $3^{rd}$ party service provided by an external service provider. As described above, the speech controller may capture a user's speech and transmit the captured speech to the server side like the device 461 or may only output a speech provided by the server side. The server side may provide information on the issue.

Furthermore, if a speech including personal information is generated (or output) at timing when a service is used, a UI/UX function capable of properly monitoring the speech and a function capable of monitoring and analyzing how many times the personal information has been generated to a certain degree may be provided. For example, the computer device 200 that implements a speech controller to perform a method of providing user notification according to various embodiments of the present disclosure may monitor the number of times that a response including personal information has been output to a user and the sensitivity of the personal information including an output response, and may analyze the monitored number and sensitivity. For example, the computer device 200 may analyze information regarding how many times pieces of personal information having what sensitivity have been exposed for a given period. As described above, the speech controller may capture a user's speech and transmit the captured speech to the server side like the device 461 or may only output a speech provided by the server side. The server side may process the monitoring of the number and sensitivity and the analysis of the information.

Furthermore, when a voice service provided by the server side and an application installed in the device 461 operate in conjunction with each other, the number of times that personal information is generated (or output) is arithmetically counted through matching between permission information of the application and PII information of a standard organization, such as National Institute of Standards and Technology (NIST). Accordingly, how much has each of the applications operating in conjunction with the voice service exposed sensitive personal information of a user may be determined. Furthermore, if an individual provider defines its own regulations and uses the regulations for personal information management, whether the corresponding regulations are obeyed (regulations are followed) may be evaluated and used. For example, the computer device 200 that implements a speech controller to perform a method of providing user notification according to various embodiments of the present disclosure may calculate the number of times that personal information is exposed through an application and the sensitivity of exposed personal information through matching between permission information of an application installed in a user device and a PII provided by a standard organization. Furthermore, the computer device 200 may detect an actual degree of risk for applications having a good possibility that sensitivity information will be exposed through the analysis of heuristic terms.

As a more detailed example, as a service used by a user using a speech controller, the confirmation of an instant message, such as a newly received social network service (SNS) message or short message service (SMS) message, may be requested from the user using the speech controller. In this case, the speech controller may identify whether the new instant message includes personal information through interoperation with the server side. If the personal information is identified, the speech controller may notify the user that the corresponding instant message includes the personal information. In this case, the user may select whether to allow the speech controller to generate (or output) the contents of the instant message including the personal information. If multiple people are present in the space where the user is located, the user may select that the speech controller does not generate (or output) the contents of the instant message.

In another embodiment, if a user request the contents of a message including personal information to be generated (or output), a speech controller may confirm the identity of the user, and may generate (or output) the contents of the message if the identity of the user is confirmed. For example, the speech controller may store (or store in an associated server side) a question (e.g., what is your favorite color?) and response (e.g., black) preset for a user. If the user requests the contents of a message including personal information to be generated (or output), the speech controller may generate (or output) the preset question to the user, and may confirm the identity of the user by comparing a response from the user with the preset response. Alternatively, if the speech controller includes a physical and/or electrical input device, such as a button or a touch screen, the speech controller may request a user input through the input device. If a valid input, such as the input of a specific pattern or physical button, is recognized, the speech controller may confirm the identity of the user. When the identity of the user is confirmed, the speech controller may generate (or output) the contents of a message including personal information in response to a request from the user.

In yet another embodiment, if a user request contents, including personal information, to be generated (or output), a speech controller may evaluate the sensitivity of the personal information included in the corresponding contents through interoperation with the server side. For example, if a user requests bank account information, the speech controller may determine that the sensitivity of personal information to be included in a response is very high. In this case, the speech controller may provide the user with contents including the personal information through a safer channel rather than generating (or outputting) the contents including the personal information. For example, after transmitting the contents, including the corresponding personal information, to the user through an SMS message, the speech controller may generate (or output) contents to notify the user that the contents including the corresponding personal information has been transmitted to the user through the SMS message and that the user needs to check the SMS message.

As described above, according to embodiments of the present disclosure, there can be provided the function for enabling a user to determine whether personal information is used and personal information is included in a response result by monitoring reference to the personal information at reference points where reference is made to the personal information in voice service processing. Furthermore, a user can be provided with guide information indicating that personal information has been included in a response result. A response result including personal information may be provided based on feedback for guide information.

The aforementioned system or apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method of providing user notification in a computer device including at least one processor, the method comprising:
   receiving, by the at least one processor, information monitored for reference to personal information in a process of processing a user's query in a voice service;
   storing, by the at least one processor, a personal information utilization history for each user and for each service based on the monitored information;
   determining, by the at least one processor, suitability of the reference to the personal information based on the monitored information;
   determining, by the at least one processor, whether the personal information is included in a response when generating the response to the user's query;
   generating and providing, by the at least one processor, guide information indicating that the personal information is included in the response if the personal information is included in the response; and
   providing, by the at least one processor, the response to the user's query based on feedback from the user for the guide information,
   wherein determining the suitability comprises determining whether a service policy has been violated in relation to access to the personal information of the user identified based on the monitored information.

2. The method of claim 1, wherein the personal information comprises at least one of personally identifiable information (PII) and potential personally identifiable information (PPII).

3. The method of claim 1, wherein the reference to the personal information is performed at least one reference point of a device that captures a speech corresponding to the user's query, the voice service that processes the captured speech, and an external service invoked by the voice service.

4. The method of claim 1, wherein determining the suitability comprises determining whether user consent has been performed normally in relation to access to the personal information of the user identified based on the monitored information.

5. The method of claim 1, wherein providing the response to the user's query comprises providing the response to the user's query through a response channel preset by the user or a response channel configured through the feedback from the user.

6. The method of claim 5, wherein the response channel comprises two or more of a speech output channel through a speaker included in a device of the user, a push notification channel for an application installed in the device of the user, a message transmission channel using a short message service (SMS) for the device of the user, a message transmission channel using an e-mail account of the user, and an information display channel through a screen of another device related to the user.

7. A method of providing user notification in a computer device including at least one processor, the method comprising:
   receiving, by the at least one processor, information monitored for reference to personal information in a process of processing a user's query in a voice service;
   storing, by the at least one processor, a personal information utilization history for each user and for each service based on the monitored information;
   determining, by the at least one processor, suitability of the reference to the personal information based on the monitored information;
   determining, by the at least one processor, whether the personal information is included in a response when generating the response to the user's query;
   generating and providing, by the at least one processor, guide information indicating that the personal information is included in the response if the personal information is included in the response; and
   providing, by the at least one processor, the response to the user's query based on feedback from the user for the guide information,
   wherein the personal information of the user is managed based on a grade or score according to at least one of a group for each user, a policy for each service and personal information handling regulations suggested in a corresponding country, and
   determining the suitability comprises determining the suitability of the reference to the personal information based on a grade or score calculated for the reference to the personal information and a grade or score for the personal information of the user.

8. A method of providing user notification in a computer device including at least one processor, the method comprising:
   receiving, by the at least one processor, information monitored for reference to personal information in a process of processing a user's query in a voice service;
   storing, by the at least one processor, a personal information utilization history for each user and for each service based on the monitored information;
   determining, by the at least one processor, suitability of the reference to the personal information based on the monitored information;
   determining, by the at least one processor, whether the personal information is included in a response when generating the response to the user's query;
   generating and providing, by the at least one processor, guide information indicating that the personal information is included in the response if the personal information is included in the response; and providing, by the at least one processor, the response to the user's query based on feedback from the user for the guide information, wherein generating and providing the guide information comprises generating the guide information based on query words defined by the voice service or a personal information usage policy of the voice service, and the guide information comprises related service provisions for responding to the user's additional query about the guide information.

9. A method of providing user notification in a computer device including at least one processor, the method comprising:

receiving, by the at least one processor, information monitored for reference to personal information in a process of processing a user's query in a voice service;

storing, by the at least one processor, a personal information utilization history for each user and for each service based on the monitored information;

determining, by the at least one processor, suitability of the reference to the personal information based on the monitored information;

determining, by the at least one processor, whether the personal information is included in a response when generating the response to the user's query;

generating and providing, by the at least one processor, guide information indicating that the personal information is included in the response if the personal information is included in the response; and providing, by the at least one processor, the response to the user's query based on feedback from the user for the guide information, wherein a server providing the voice service is configured to:

recognize the user based on speech information corresponding to the user's query, issue a permission key capable of accessing the personal information of the recognized user, check user consent and a service policy based on the permission key when a command selected based on the speech information accesses the personal information of the user, issue an access token having a grade based on the user consent and the service policy, generate a response related to the personal information of the user by confirming the grade of the access token when a service using the access token is invoked.

10. A method of providing user notification in a computer device including at least one processor, the method comprising:

receiving, by the at least one processor, information monitored for reference to personal information in a process of processing a user's query in a voice service;

storing, by the at least one processor, a personal information utilization history for each user and for each service based on the monitored information;

determining, by the at least one processor, suitability of the reference to the personal information based on the monitored information;

determining, by the at least one processor, whether the personal information is included in a response when generating the response to the user's query;

generating and providing, by the at least one processor, guide information indicating that the personal information is included in the response if the personal information is included in the response;

providing, by the at least one processor, the response to the user's query based on feedback from the user for the guide information;

outputting, by the at least one processor, a speech for requesting consent for usage and exposure of the personal information;

receiving, by the at least one processor, a response to the output speech; and determining, by the at least one processor, whether consent for the usage and exposure of the personal information has been given based on contents of the received response.

11. A method of providing user notification in a computer device including at least one processor, the method comprising:

receiving, by the at least one processor, information monitored for reference to personal information in a process of processing a user's query in a voice service;

storing, by the at least one processor, a personal information utilization history for each user and for each service based on the monitored information;

determining, by the at least one processor, suitability of the reference to the personal information based on the monitored information;

determining, by the at least one processor, whether the personal information is included in a response when generating the response to the user's query;

generating and providing, by the at least one processor, guide information indicating that the personal information is included in the response if the personal information is included in the response;

providing, by the at least one processor, the response to the user's query based on feedback from the user for the guide information; and providing, by the at least one processor, the user with information on an issue from a personal information generation viewpoint, which is capable of occurring, in advance or at timing when a third party service is provided by an external service provider, when the at least one processor operates in conjunction with the third party service.

12. A method of providing user notification in a computer device including at least one processor, the method comprising:

receiving, by the at least one processor, information monitored for reference to personal information in a process of processing a user's query in a voice service;

storing, by the at least one processor, a personal information utilization history for each user and for each service based on the monitored information;

determining, by the at least one processor, suitability of the reference to the personal information based on the monitored information;

determining, by the at least one processor, whether the personal information is included in a response when generating the response to the user's query;

generating and providing, by the at least one processor, guide information indicating that the personal information is included in the response if the personal information is included in the response;

providing, by the at least one processor, the response to the user's query based on feedback from the user for the guide information;

monitoring, by the at least one processor, a number of times that a response including the personal information is output to the user and sensitivity of the personal information including the output response; and analyzing, by the at least one processor, the monitored number and sensitivity.

13. A method of providing user notification in a computer device including at least one processor, the method comprising:
receiving, by the at least one processor, information monitored for reference to personal information in a process of processing a user's query in a voice service;
storing, by the at least one processor, a personal information utilization history for each user and for each service based on the monitored information;
determining, by the at least one processor, suitability of the reference to the personal information based on the monitored information;
determining, by the at least one processor, whether the personal information is included in a response when generating the response to the user's query;
generating and providing, by the at least one processor, guide information indicating that the personal information is included in the response if the personal information is included in the response;
providing, by the at least one processor, the response to the user's query based on feedback from the user for the guide information; and
calculating, by the at least one processor, a number of times that the personal information is exposed through an application and sensitivity of the exposed personal information through matching between permission information of the application installed in a device of the user and a PII provided by a standard organization.

14. A non-transitory computer-readable recording medium in which a computer program for executing a method according to claim 1 in a computer device is written.

15. A computer device, comprising:
at least one processor configured to execute a computer-readable command,
wherein the at least one processor is configured to:
receive information monitored for reference to personal information in a process of processing a user's query in a voice service;
store a personal information utilization history for each user and for each service based on the monitored information;
determine suitability of the reference to the personal information based on the monitored information;
determine whether the personal information is included in a response when generating the response to the user's query;
generate and provide guide information indicating that the personal information is included in the response; and
provide the response to the user's query based on feedback from the user for the guide information,
wherein the at least one processor is configured to determine whether a service policy has been violated in relation to access to the personal information of the user identified based on the monitored information.

16. The computer device of claim 15, wherein the reference to the personal information is performed at least one reference point of a device that captures a speech corresponding to the user's query, the voice service that processes the captured speech, and an external service invoked by the voice service.

17. The computer device of claim 15, wherein the at least one processor is configured to determine whether user consent has been performed normally in relation to access to the personal information of the user identified based on the monitored information.

18. A computer device, comprising:
at least one processor configured to execute a computer-readable command,
wherein the at least one processor is configured to:
receive information monitored for reference to personal information in a process of processing a user's query in a voice service;
store a personal information utilization history for each user and for each service based on the monitored information;
determine suitability of the reference to the personal information based on the monitored information;
determine whether the personal information is included in a response when generating the response to the user's query;
generate and provide guide information indicating that the personal information is included in the response; and
provide the response to the user's query based on feedback from the user for the guide information,
wherein the personal information of the user is managed based on a grade or score according to at least one of a group for each user, a policy for each service and personal information handling regulations suggested in a corresponding country, and
the at least one processor is configured to determine the suitability of the reference to the personal information based on a grade or score calculated for the reference to the personal information and a grade or score for the personal information of the user.

* * * * *